G. P. THOMAS.
MILLING MACHINE.
APPLICATION FILED JAN. 21, 1907.

908,816.

Patented Jan. 5, 1909.

3 SHEETS—SHEET 1.

WITNESSES:
J. Herbert Bradley.
Charles Barnett

INVENTOR
George Paul Thomas
by Christy and Christy
Atty's.

G. P. THOMAS.
MILLING MACHINE.
APPLICATION FILED JAN. 21, 1907.
908,816.
Patented Jan. 5, 1909.
3 SHEETS—SHEET 2.
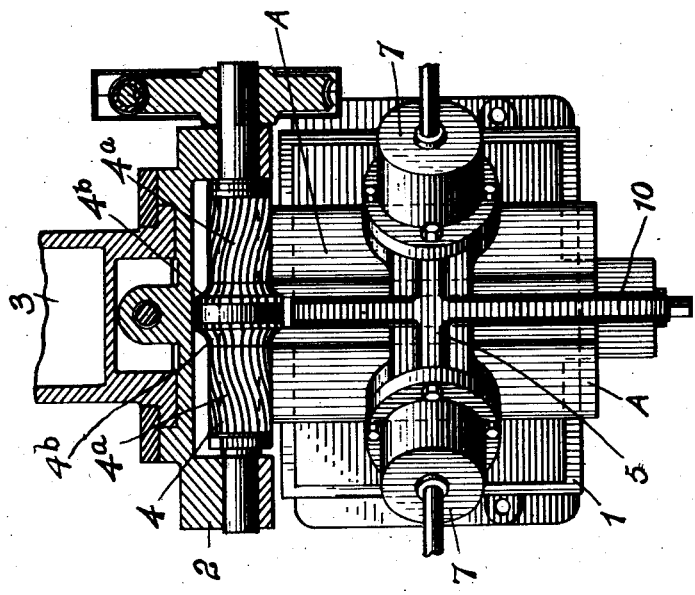
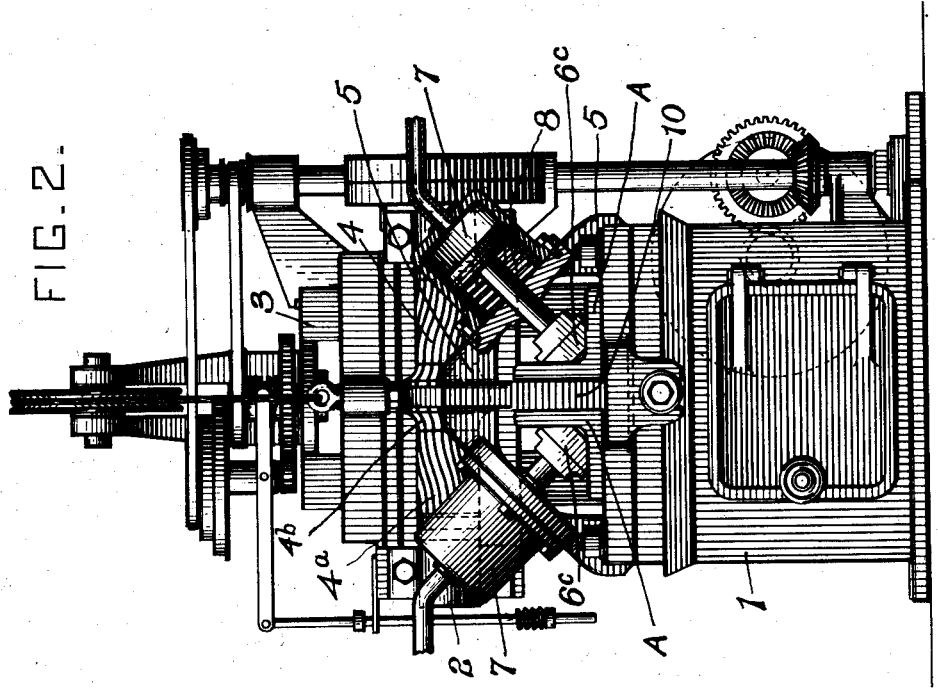
WITNESSES:
INVENTOR
George Paul Thomas
by Christy and Christy
Atty'

G. P. THOMAS.
MILLING MACHINE.
APPLICATION FILED JAN. 21, 1907.

908,816.

Patented Jan. 5, 1909.

3 SHEETS—SHEET 3.

WITNESSES:

INVENTOR
George Paul Thomas
by Christy and Christy
Atty's

UNITED STATES PATENT OFFICE.

GEORGE PAUL THOMAS, OF PITTSBURG, PENNSYLVANIA.

MILLING-MACHINE.

No. 908,816. Specification of Letters Patent. Patented Jan. 5, 1909.

Application filed January 21, 1907. Serial No. 353,262.

*To all whom it may concern:*

Be it known that I, GEORGE PAUL THOMAS, residing at Pittsburg, in the county of Allegheny and State of Pennsylvania, a citizen of the United States, have invented or discovered certain new and useful Improvements in Milling-Machines, of which improvements the following is a specification.

My invention relates to improvements in milling machines; and the object of my improvement is a machine in which the ends of structural beams of steel, or other similar work, may be milled with greater expedition than has heretofore been possible.

Structural beams of steel are rolled in mills, and then sheared or sawed into lengths. Beams thus formed are largely used as braces or stiffening pieces for bridge and other structural work, and when such beams are to be used for this or other like purpose, the rough ends left by the shear or saw must be finished by milling to abut closely against the surfaces and fit snugly in the angles of corresponding beams, where they are secured by bolts or rivets.

In the accompanying drawings I have shown a machine for milling the ends of beams, which in general features is of well known construction, but which in details embodies my present improvements.

Figure 1:
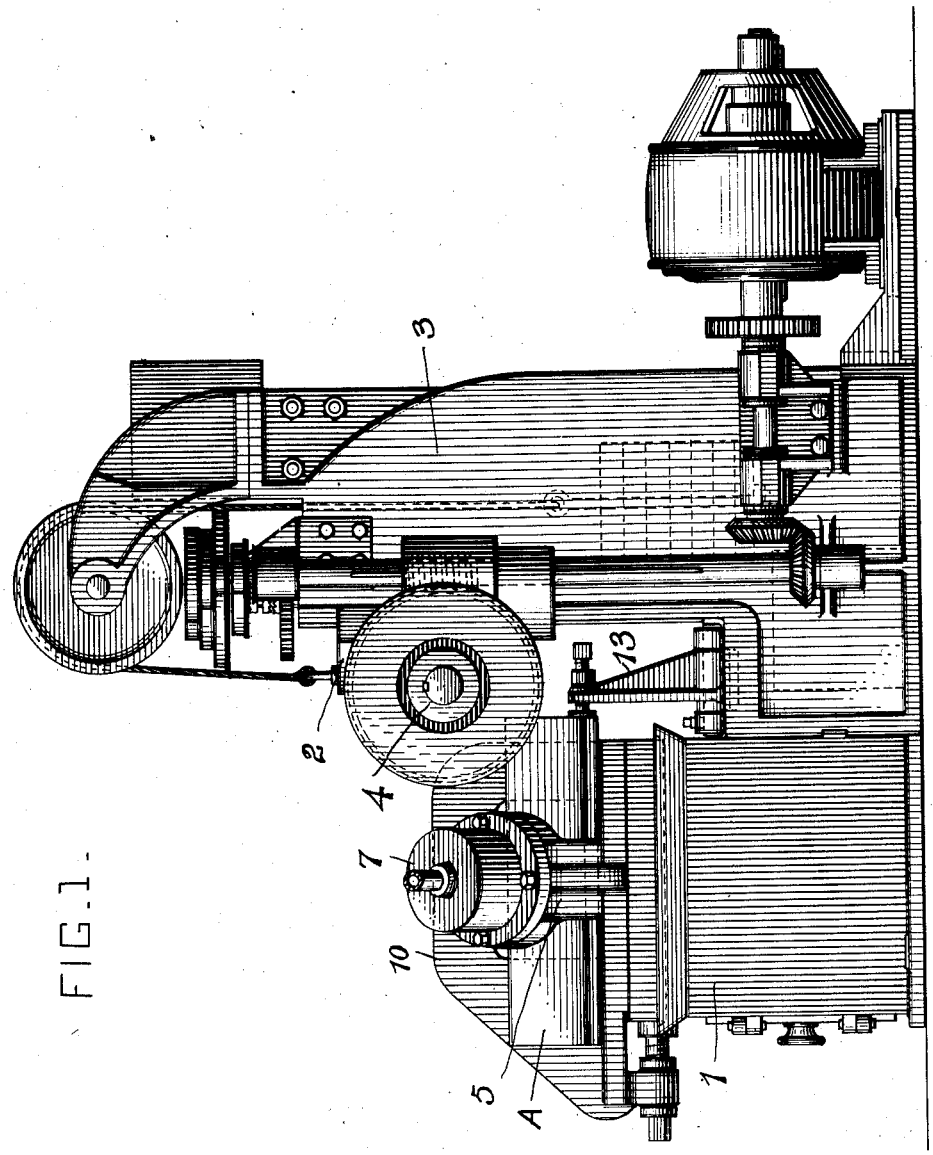
Figure 4:
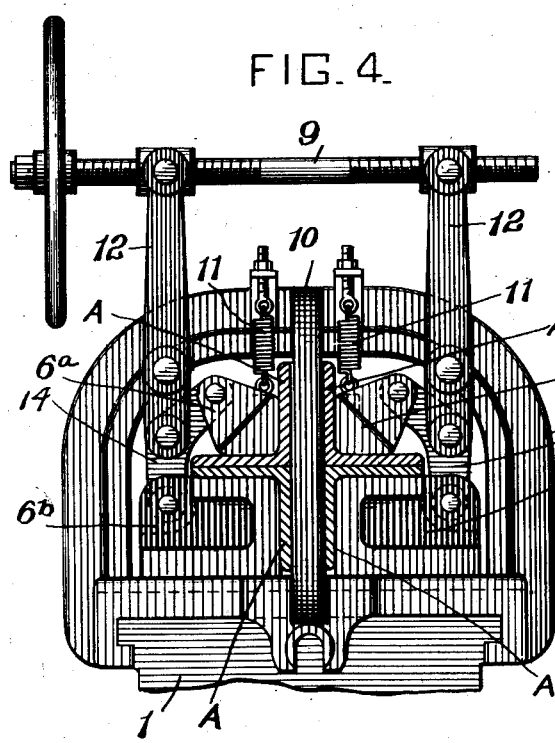
Figure 5:
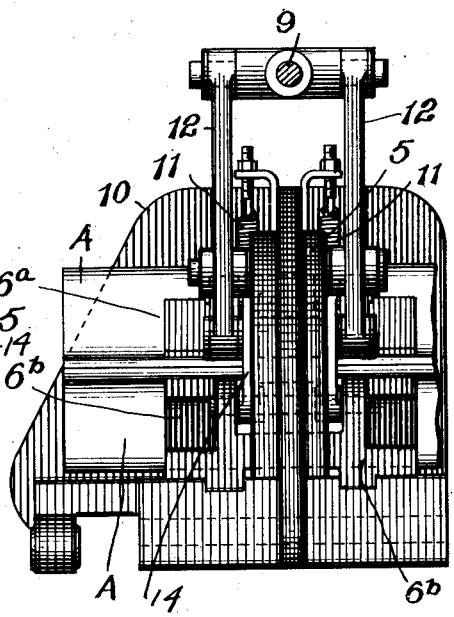

In these drawings Figure 1 shows the machine in side elevation; Fig. 2 is a front elevation, one of the clamping members (hereinafter described) being shown in section; Fig. 3 shows the table and cutting tool in plan, and the other parts in horizontal section; Figs. 4 and 5 show in front and in side elevation the table with its clamping devices in modified form.

The machine consists essentially of a work-sustaining table, 1, whereon the beam or like article is sustained and clamped in position during the milling operation; and a milling head, 2, reciprocating in a suitable frame 3 (preferably though not necessarily in vertical direction). In the milling head 2 is carried the cutter, 4. (See Figs. 2 and 3). Suitable mechanism is provided for causing the milling head to pass to and fro across the end of the beam, A, when the latter is clamped in proper position upon table 1, and for causing the cutter to revolve to perform the milling operation as it advances. Such mechanism is shown in the drawings, but being well known to builders of such machines does not require detailed description.

My invention is first concerned with means for expeditiously clamping a plurality of pieces of work, A, upon the table 1; and the means consist of a frame, 5, spanning the table and beneath which the work lies upon the table, of one or more chucks or blocks, 6$^c$, arranged to bear upon the work, and of means carried by the frame 5 for exerting upon the chuck or chucks 6 pressure to simultaneously clamp the several pieces of work upon the table.

In Figs. 2 and 3 I have shown means for exerting pressure upon blocks 6$^c$, consisting of pneumatic cylinders, 7, carrying the blocks 6 upon the ends of their piston rods. These pneumatic cylinders are of familiar construction, and require no description; it should however be observed that I preferably arrange springs, 8, beneath their pistons to raise them and release the clamping blocks 6 when the pneumatic pressure is relieved. It will be understood that such cylinders, when more than one are used, may be coincidently operated.

In Figs. 4 and 5 pressure is exerted upon the blocks through levers, and these levers may be driven in any preferred manner, as by a screw-threaded rod, 9, which may be turned to drive the blocks 6 to their engagement, the means for turning the rod being such as may be desired.

In Figs. 2 and 3 is an arrangement for clamping angle beams on the table. As here shown, two angle beams are arranged back to back upon the table and preferably against a web, 10, which extends medially along the table, and arranged to be simultaneously acted upon by a double-faced cutter. In this instance the blocks, 6$^c$, engage the angles of the beams and the pressure is exerted obliquely and simultaneously to clamp them both upon the table and against the web, 10.

In Figs. 4 and 5 an arrangement is shown for clamping four angle beams upon the table for simultaneous action by the milling tool. The beams are arranged in pairs, and placed back to back preferably against and upon either side of web 10, as shown in Fig. 4. Two pairs of blocks are employed, 6$^a$, engaging the upper beams, and supported by springs 11 in frame 5 that they may readily be brought into engaging position, and 6ᵇ, engaging the lower beams, and resting upon the surface of the table. The members 6ᵃ 6ᵇ of each pair of blocks, are pivotally mounted on floating levers 14 which are pivotally connected at points intermediate of the blocks 6ᵃ 6ᵇ to the main levers 12. These levers are pivoted in frame 5, and are so arranged that when screw rod 9 which engages their upward extending arms is turned they drive blocks 6ᵃ and 6ᵇ inward to clamp the beams in place and outward to release said beams. It will be obvious that the particular construction shown in Figs. 4 and 5 may be adopted for clamping two beams upon the table.

In Fig. 1 I have shown a stop, 13, against which the work, A, upon table 1 is advanced and brought to position. When the work is brought to position against the stop, the end to be milled lies in the path of the cutter. The stop is arranged to be swung to one side after the work is brought to position against it and clamped upon the table, and when swung aside the path of the cutter is unobstructed.

Another feature of invention lies in my double-faced cutter. In finishing the butt ends of beams for structural work in the manner described, the requirements are not only that the surface be finished smooth, but also ordinarily that one edge be rounded, to engage snugly the surface of an angle beam against which it is made to abut. In such case the finished edge is shaped by the cutter. Double-faced cutters have been employed before, to act coincidently upon two beams suitably arranged upon a supporting table; but double-faced cutters heretofore employed have been of more elaborate construction. My cutter consists essentially of two symmetrically arranged cutting surfaces (see Fig. 3), arranged upon either side of the medial line of the machine, and separated at a distance corresponding to the width of web 10 upon table 1. For structural convenience and economy, such a cutter is formed in three sections, the two laterally disposed cylindrical portions, 4ᵃ, and the central, curve-cutting portion, 4ᵇ.

The operation of the parts of the machine will readily be understood. The cutting head is raised, and the blocks 6 are released from clamping pressure; stop 13 is swung to the position shown in Fig. 1. The work is placed upon table 1, brought to position against stop 13, and clamped. Stop 13 is then swung to one side, and the cutter head caused to descend to perform its proper office. When the work of milling is done the beams are released, and their opposite ends are brought into position, or other beams replace them, and the sequence of steps of operation is again performed.

It will be understood that the detailed arrangement of parts shown and described may be varied, without departing from the spirit of my invention.

It is characteristic of my improvement that the clamping block or blocks move in planes at acute angles to the surface of the work-sustaining table, and that the pressure exerted on the article by the blocks has two components, one pressing the article down on the table and the other tending to move the article along the table. This latter component is resisted by an abutment which may be a portion of the table, as the web 10, or another clamping block moving in a plane at an angle to the plane of movement of the first block. This construction presents a positive resistance in two directions to the movement of the article, whereas if the clamping block or blocks moved in planes at right angles to the work-sustaining table, the article would be positively held in one direction only, it being held from movement in other directions by friction between it and the table and clamping block.

I claim as my invention.

1. In a milling machine the combination of a work-sustaining table, a frame carried by said table and spanning the work-sustaining surface thereof, means carried by said frame and movable in planes at acute angles to the table for clamping an article on said table, and means for holding the article from movement on the table by the thrust of the clamping means.

2. In a milling machine the combination of a work-sustaining table, a pair of levers pivotally mounted on said table, floating levers pivotally mounted on the main levers, and clamping blocks pivotally mounted on the floating levers on opposite sides of their pivotal points.

3. In a milling machine the combination of a work-sustaining table, a frame carried by said table, a pair of levers pivotally mounted in said frame, a pair of clamping members having a common connection to each of said levers, and means for swinging the levers to simultaneously move the clamping members on both levers toward and from clamping position.

4. In a milling machine, the combination of a work-sustaining table, a web extending medially and longitudinally upon said table, a pair of blocks arranged upon either side of said medial web, and means for simultaneously clamping two angle beams in symmetrical positions upon said table and upon opposite sides of said web, and beneath said blocks, substantially as described.

5. In a milling machine, the combination of a work-sustaining table, a web extending medially and longitudinally upon said table, a pair of blocks arranged upon either side of said web, and means for exerting pressure upon said blocks simultaneously and in oblique direction, substantially as described.

6. In a milling machine, the combination of a work-sustaining table, a web extending medially and longitudinally upon said table, four blocks arranged to engage four angle beams when placed in pairs back to back upon opposite sides of said web, and means for exerting clamping pressure upon said blocks when so engaging four angle beams, substantially as described.

7. In a milling machine, the combination of a work-sustaining table, a pair of blocks and means for simultaneously moving said blocks in converging planes at acute angles to the sustaining table to clamping engagement with a pair of angle beams systematically placed back to back upon said table.

8. In a milling machine, the combination of a work-sustaining table, a web extending medially and longitudinally upon said table, a pair of blocks arranged upon either side of said medial web and coöperating with said web to engage two pieces of work symmetrically placed on opposite sides thereof, a pair of levers engaging said blocks, and means for simultaneously swinging said levers, substantially as described.

9. In a milling machine, the combination of a work-sustaining table, a web extending medially and longitudinally upon said table, and a cutting tool reciprocating with relation to said table; said cutting tool having symmetrically arranged cutting faces separated at a distance corresponding to the width of the web upon the work-sustaining table, substantially as described.

10. In a milling machine, the combination of a work-sustaining table, a web extending medially and longitudinally upon said table, and a cutting tool reciprocating with relation to said table; said cutting tool consisting of a central portion having symmetrically arranged cutting faces separated at a distance corresponding to the width of said web, and of lateral portions arranged upon either side of said central portion, substantially as described.

In testimony whereof, I have hereunto set my hand.

GEORGE PAUL THOMAS.

Witnesses:
CHARLES BARNETT,
W. H. WILSON.